May 13, 1941.                J. E. BURBANK                2,241,804
                          WEB FEEDING APPARATUS
                 Filed Nov. 29, 1939          2 Sheets-Sheet 1

INVENTOR
John E. Burbank
BY Kenyon Kenyon
ATTORNEYS

Patented May 13, 1941

2,241,804

UNITED STATES PATENT OFFICE 2,241,804

WEB FEEDING APPARATUS

John E. Burbank, Poundridge, N. Y., assignor, by mesne assignments, of fifty-one one hundredths to William N. Cheyney, Montclair, N. J., and forty-nine one hundredths to Raymond H. Lutz, Norwalk, Conn.

Application November 29, 1939, Serial No. 306,597

24 Claims. (Cl. 271—2.4)

This invention relates to web feeding apparatus and more especially to apparatus for feeding photographic paper through the camera of a photo-printing machine, although it is adapted for other uses. In the operation of the camera of a photo-printing machine, the web of photographic paper is exposed for a predetermined period by opening the camera shutter and after closure of the shutter is then advanced a predetermined distance.

An object of this invention is web feeding means controlled by operation of a single control member effective after a predetermined interval of time following the operation of the control member to automatically advance the web a predetermined distance and if the control member is retained in actuated position to continue such sequence indefinitely.

An object of this invention is a camera of the aforementioned type having provision for automatically actuating a camera shutter to effect exposure of photographic paper for a predetermined period and automatically feeding such photographic paper through a predetermined distance after each operation of the shutter.

A further object of this invention is simple, efficient and fool-proof mechanism for automatically accomplishing operation of the camera shutter and paper feeder in response to the actuation of a single switch by the operator.

Other objects, novel features and advantages of this invention will become apparent from the following specification and accompanying drawings, wherein:

Fig. 3 is a section substantially on the line 3—3 of Fig. 1;

Fig. 4 is a section substantially on the line 4—4 of Fig. 2, and

Fig. 5 is a view similar to Fig. 4 illustrating a modification.

Figure 1:
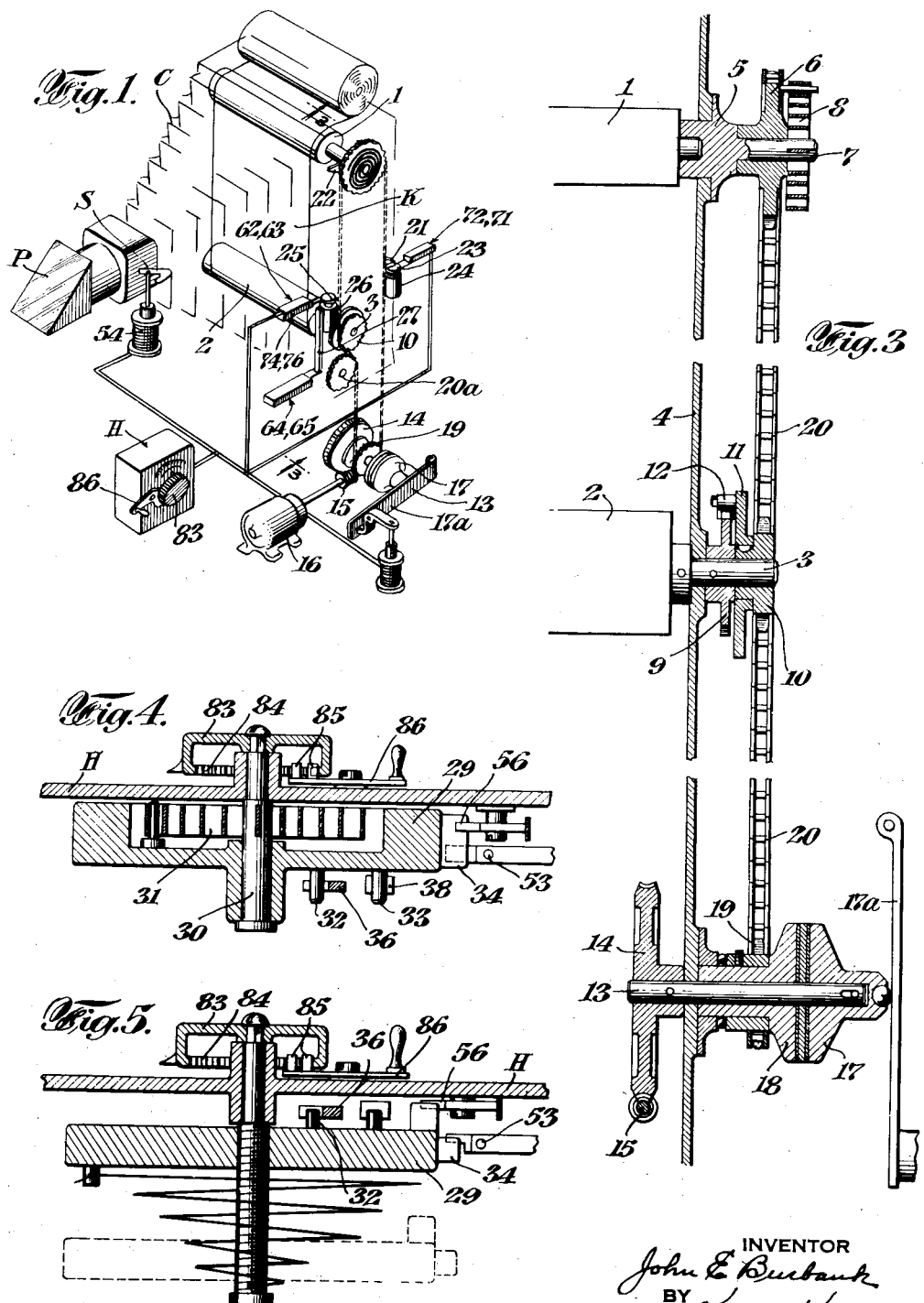
Fig. 1 is a schematic perspective view of a device embodying the invention.

In Fig. 1, C indicates a camera including an enclosed shutter equipped with an operating arm S. The camera is provided with a lens system including the prism P for producing an image on a strip of light sensitive paper K which is fed step by step through the medium of means subsequently to be described. The strip K is led from a suitable roll thereof over an idle roller 1 to a drive roller 2 fixed to a shaft 3 journalled in a frame 4 which also supports a hub 5 in which the roller 1 is journalled. A sprocket 6 is rotatably mounted on a shaft 7 extending from the hub 5 and a spiral spring 8 has one end attached to the shaft 7 and the other end attached to the sprocket 6. The shaft 3 has fixed thereto a ratchet wheel 9 and has rotatably mounted thereon a sprocket 10 to which is keyed a disk 11 having a pawl 12 for co-operation with the teeth of the ratchet wheel 9. A shaft 13, journalled in the frame 4, carries a worm wheel 14 which meshes with a worm 15 carried by the shaft of a motor 16. Also slidably keyed to the shaft 13 is one plate 17 of a friction clutch, the other plate 18 of which is rotatably supported by the shaft 13 and has a sprocket 19 fixed thereto. A chain 20 is trained around the sprockets 6, 10 and 19 and also is engaged by an idler sprocket 20a.

A pivoted lever 17a engages a ball in the clutch plate 17 and is operable to engage and release the clutch. When the clutch is engaged and the motor is running, the chain 20 is moved in such direction as to rotate the sprocket 6 to put the spring 8 under tension and also to rotate the sprocket 10 to transmit power to the roller 2 through the pawl 12 and ratchet wheel 9 to feed the paper K downwardly. Means, later to be described, are provided for stopping the motor and releasing the clutch after a predetermined extent of movement of the chain 20, whereupon it is returned to original position by the spring 8. Return of the chain to original position has no effect upon the roller 2 as the pawl 12 rides over the teeth of the ratchet wheel 9 without affecting rotation of such wheel.

The chain 20 is equipped with a pair of lugs 21 and 22, the former of which moves upwardly and the latter of which moves downwardly when the chain 20 is driven by the motor 16 and move oppositely when the chain is driven by the spring 8. In the position of rest of the chain 20, the lug 21 rests upon the head of a spring-pressed plunger 23 seated in a dash-pot 24, the plunger being held in its lowermost position by the lug 21 and being moved upwardly by its spring to a slight extent upon upward movement of the lug 21. Upon its downward movement, the lug 22 engages the head of a spring-pressed plunger 25 supported by a dash-pot 26 which in turn is supported by the end of a pivoted metal lever 27 resting on a spring 28. The spring for the plunger 25 and the spring 28 are so designed that engagement of the lug 22 with the plunger 25 first causes limited unitary downward move- ment of the plunger and dash-pot with subsequent additional downward movement of the plunger 25 relative to the dash-pot.

A fly wheel 29 is rotatably supported in a suitable housing H on a stationary shaft 30 and a spiral spring 31 has its inner end fixed to the shaft 30 and has its outer end fixed to the fly wheel 29. The fly wheel carries a pair of pins 32 and 33 and is provided with peripheral lugs 34 and 35 having opposed radially extending faces. A vertically movable rod 36 has a flat surface lug 37 underlying the pin 32 and under the pin 33 is provided a spring-supported vertically movable stop rod 38 having its bottom end mounted in a dash-pot 39 and a reciprocable spring-actuated latch rod 40 engages the lug 35. The spring 31 is so connected to the fly wheel 29 that it is under slight tension tending to maintain the pin 32 in contact with the lug 37 and to oppose counter-clockwise rotation of the flywheel 29. A solenoid 41 is provided for pulling the rod 36 upwardly and a solenoid 42 is provided for moving the rod 40 out of engagement with the lug 35. One terminal of the winding of each of the solenoids 41 and 42 is electrically connected to a movable contact 43 supported by a pedal 44 for co-operation with a fixed contact 45, the pedal being biased by a spring toward contact-open position. The remaining terminal of each of said solenoids is electrically connected to a fixed contact 46 with which co-operates a spring-actuated contact 47, the latter being biased toward contact-closed position. The contact 47 is connected to the line L₁ of a supply circuit. The contact 45 is electrically connected to a fixed contact 48 which is normally engaged by a contact 49 carried by the armature 50 of a relay 51, the armature 50 being biased toward the contact 48 and electrically connected to the line L₂ of said supply circuit. Thus, upon closing of the contacts 43 and 45 by operation of the pedal 44, the latch 40 is retracted and the rod 36 is sharply pulled upwardly to cause counter-clockwise rotation of the wheel 29. The wheel 29 continues its counter-clockwise rotation against the tension of the spring 31 until the tension of the spring overcomes the inertia of the wheel, whereupon the spring 31 effects clockwise rotation of the wheel 29. The rod 36 moves upwardly a short distance with the lug 37 in contact with the pin 32 and when the rod 36 reaches the upper limit of its path, the pin 32 moves away from the lug 37 under the influence of the inertia developed in the flywheel by the sharp impact applied from the rod 36 to the pin 32.

A fixed contact 53 is electrically connected to one terminal of solenoid 54, the plunger of which is connected to the shutter-operating lever S. The remaining terminal of the solenoid 54 is connected to the line L₁. A contact 55 is biased toward the contact 53 but is normally held in spaced relation thereto by the lug 34 and this contact is electrically connected to the line L₂. Therefore, when the wheel 29 is rotated counter-clockwise, the contact 55 engages the contact 53 to energize the solenoid 56, thereby opening the shutter. The shutter remains open until the contact 55 is disengaged from the contact 53 upon the return of the wheel 29 to original position.

A bell crank lever 56 has one arm extending into the path of the lug 34 and has its other arm engaging the support for the contact 47. A spring 57 tends to maintain the lever 56 in one position while permitting rotation thereof by engagement of the lug 34 therewith. On counter-clockwise movement of the wheel 29, the relationship of the contacts 46 and 47 is undisturbed but upon return of the wheel 29 to original position, the bell crank lever 56 is so operated just prior to re-engagement of the pin 32 with the lug 37 as to disengage the contact 47 from the contact 46 and is held in actuated position until the flywheel returns to its initial position, thereby breaking the energizing circuits for the solenoids 41 and 42 and permitting return of the rod 36 and latch 40 to original position. The energizing circuits for the solenoids 41 and 42 are also broken by disengagement of the contact 43 from the contact 45 and the provision of the contacts 46 and 47, together with the bell crank lever 56 is for the purpose of effecting de-energization of the solenoids 41 and 42 should the operator hold the pedal 44 with the contacts 43 and 45 engaged.

Upon rotation of the wheel 29 under the influence of the spring 31, the pin 33 engages the top of the rod 38 which brings the wheel to a stop with a cushioned effect and then rotates it clockwise sufficiently to bring the lug 35 again into engagement with the latch 40. While the wheel 29 is being brought to rest by the spring stop 38, the lug 34 engages the end of the resilient holder for the contact 55 to move a second contact 58 carried by said holder into engagement with a fixed contact 59. These two contacts remain in engagement only momentarily and are disengaged immediately upon the return of the wheel 29 to such position that the lug 35 engages the latch 40.

The fixed contact 59 is electrically connected to one terminal of a relay 51, the other terminal of which is connected to the line L₁. Thus, the engagement of the contact 58 with the contact 59 energizes the relay 51 to actuate the armature 50 to disengage its contact 49 from the contact 48, thereby opening the energizing circuits of the solenoids 41 and 42. Also, actuation of the armature 50 brings its contact 60 into engagement with a fixed contact 61. The contact 61 is electrically connected to a fixed contact 62 normally engaged by a spring-actuated contact 63 biased toward the contact 62 and movable away therefrom upon downward movement of the plunger 25 by the lug 22 on its downward movement, the contact 63 being electrically connected through the winding of the relay 51 to the line L₁. The engagement of the contacts 60 and 61, therefore, closes a holding circuit through the solenoid 51 to maintain the armature 50 in actuated position. The contact 61 is also electrically connected to a contact 64 carried by the lever 27 and normally engaging a fixed contact 65 which is electrically connected to one terminal of the motor 16. A resistance 70 is connected in shunt to the contacts 64 and 65. The other terminal of the motor 16 is connected to a movable contact 66 engageable with a fixed contact 67 which is connected to the line L₁. The contact 66 is carried by a vibrating member 68 having an armature 68a arranged between the poles of a permanent magnet 69 which is effective impositively to hold the contact 66 in engagement or out of engagement with the contact 67. With the contacts 66 and 67 engaged, operation of the armature 50 to engage the contacts 60 and 61 energizes the motor 16.

A solenoid 70 has its plunger connected to the lever 17a for engaging the clutch upon energization of the solenoid. The solenoid 70 is connected in shunt to the motor 16 so that it is energized simultaneously with the motor. However, due to a certain time lag in the operation of the clutch, the motor is well started before the clutch becomes effective.

The contact 61 also is electrically connected to a fixed contact 71 engageable by a movable contact 72 biased away from the contact 71 but held engaged with the contact 71 by the plunger 23 when the lug 21 is in its lowermost position or its position of rest. The contact 72 is connected through the field winding of a solenoid 73 to the line $L_1$ so that with the contacts 60 and 61 closed and the contacts 70 and 72 closed, the solenoid 73 is energized.

A movable contact 74 connected through the winding of a solenoid 75 to the line $L_1$ is attached to the contact 63 for simultaneous movement therewith toward and away from a fixed contact 76, which is connected to the line $L_2$. When the contacts 74 and 76 are closed, the solenoid 75 is energized. The vibratory member 68 carries an armature 77 common to both solenoids 73 and 75, and means, later to be described, are provided for controlling alternative energization of the solenoids for moving the vibratory member between a position in which the contacts 66 and 67 are engaged and a position in which they are disengaged.

Upon operation of the chain 20 by the motor 16, the lug 21 releases the plunger 23 for upward movement to effect opening of the contacts 71 and 72, thereby de-energizing the solenoid 73. Also, after a predetermined extent of movement of the chain, the lug 22 engages the plunger 25 to first effect unitary downward movement of the plunger and dash-pot with consequent opening of the contacts 64 and 65 to open the shunt around the resistance R, thereby reducing the energy supplied to the motor 16 with consequent reduction of its speed. Continued downward movement of the plunger 25 relative to the dash-pot by the lug 22 effects opening of the contacts 62 and 63 and closure of the contacts 74 and 76, thereby opening the holding circuit of the relay 51 and closing the energizing circuit for the solenoid 75 with consequent operation of the vibratory member 68 to open the contacts 66 and 67 to de-energize the solenoid 70 and the motor 16. The reverse procedure is effected upon operation of the chain 20 by the spring 8.

A green light 80 is bridged across the lines $L_1$ and $L_2$ in series with the contacts 48 and 49 while a yellow light 81 is bridged across the terminals of the solenoid 54 and red light 82 is bridged across the terminals of the motor 16. The green light indicates that the power has been turned on and that the apparatus is in condition for operation. This light remains on during the operation of the fly wheel 29, but is extinguished upon opening of the contacts 48 and 49. The yellow light is on only when the solenoid 54 is energized or during the period that the shutter is opened and the light 82 is on only during the period that the motor 16 is in operation.

Figure 2:
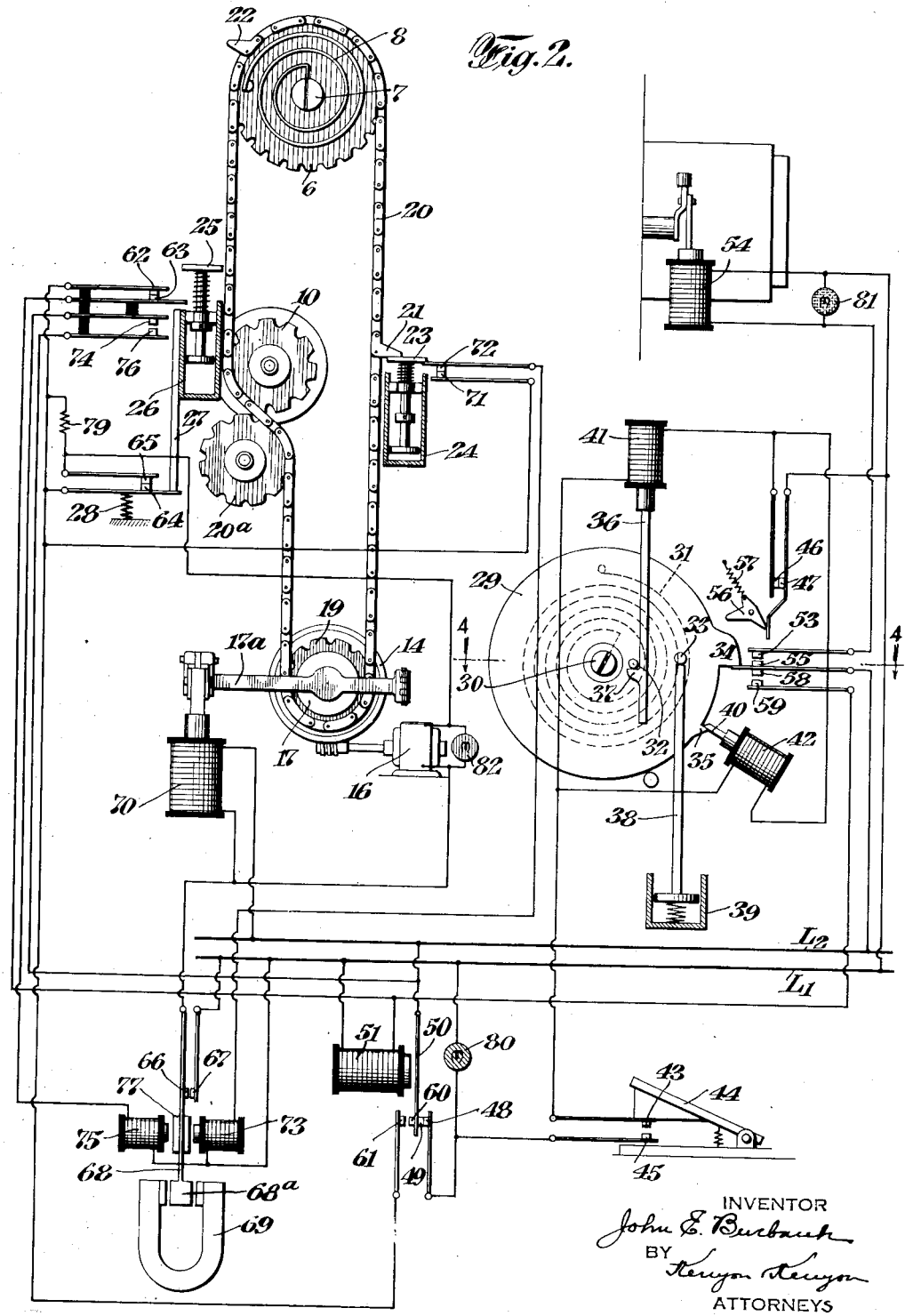
Fig. 2 is a combined schematic view and wiring diagram.

The operation of the above-described device is as follows:

With the various parts in the position shown in Fig. 2, the device is at rest and is in condition for operation. The operator actuates the pedal 44, thereby closing the contacts 43 and 45 to energize the solenoids 41 and 42, whereupon the rod 36 is sharply pulled up for a short distance to the wheel 29 tending to rotate it counter-clockwise. Rotation of the wheel 29 causes the contacts 53 and 55 to close, thereby energizing the solenoid 54 to open the camera shutter. After the inertia of the wheel 29 has been absorbed by the spring 30, the spring becomes effective to rotate the wheel 29 counter-clockwise. On its return stroke, the wheel actuates the bell crank lever 56 before the pin 32 re-engages the lug 37, to open the contacts 46 and 47, thereby de-energizing the solenoids 41 and 42. Also, it opens the contacts 53 and 55, thereby closing the shutter and further it closes the contacts 58 and 59 to energize the relay 51, thereby moving the armature 50 to open contacts 48 and 49 and close conttcts 60 and 61, with consequent opening of the energizing circuits for the solenoids 41 and 42 at a second place. Closing of the contacts 60 and 61 closes the energizing circuit for the relay 51 and closes the energizing circuit for the solenoid 73, thereby actuating the armature 77 to close the contacts 66 and 67 with consequent closing of the motor circuit and the circuit for the solenoid 70. Operation of the motor 60 through the medium of the clutch causes advancement of the chain 20, the first effect of which is to disengage the lug 21 from the plunger 23, thereby opening the contacts 71 and 72 in the energizing circuit for the solenoid 73. The vibratory member 68 is kept in position with the contact 66 engaging the contact 67 through the influence of the permanent magnet 69. Further movement of the chain 20 brings the lug 22 into engagement with the plunger 25 to effect unitary downward movement of the plunger and dash-pot 26 to operate the lever 27 to open contacts 64 and 65, thereby introducing the resistance R into the motor circuit and causing the motor to slow down. Further movement of the lug 22 brings the head of the plunger 25 into engagement with the holder for the contact 63, thereby opening the contact 62 and 63 as well as closing the contacts 74 and 76. Opening of the contacts 62 and 63 opens the energizing circuit of the relay 51 while closing of the contacts 74 and 76 closes the energizing circuit of the solenoid 75 thereby causing movement of the vibratory member 68 to disengage the contact 66 from the contact 67 to open the motor circuit. Also, release of the armature 50 reconditions the energizing circuits of the solenoids 41 and 42 for further operation of the wheel 29. Upon release of the clutch, the spring 8 returns the chain 20 to its original position, thereby disengaging the lug 22 from the plunger 25 with the result that the contacts 64 and 65 are closed, the contacts 74 and 75 are opened and the contacts 62 and 63 are closed. Opening of the contacts 74 and 76 de-energizes the solenoid 75, but the vibratory member 68 is held by he permanent magnet 69 in such position that the contact 66 is disengaged from the contact 67. Further reverse movement of the chain 20 brings the lug 21 again into engagement with the plunger 23 to close the contacts 71 and 72, thereby conditioning the energizing circuit of the solenoid 73 for subsequent closing when the contact 60 again engages the contact 61.

The length of time that the shutter remains open is dependent on the operating period of the fly wheel 29 and means are provided for effecting a variation of such period. The shaft 30 is adjustably supported by the wall of the housing H and is provided with a button 83 exterior of the housing for rotating the shaft to increase the tension of the spring 31. The button 83 is provided with a series of teeth 84 engageable by a pair of escapement pins 85 carried by a lever 86 pivoted to the housing wall. Engagement of one of the pins 85 with a tooth 84 locks the button in any given position, but the button may be adjusted to reduce the tension of the spring 31 by engaging the pins 85 alternately with the teeth 84 to turn the button step by step. The fly wheel arrangement illustrated in Fig. 4 permits operation of the fly wheel through only less than a complete revolution. The modification illustrated in Fig. 5, however, permits operation of the fly wheel through more than one complete revolution. In this modification, the shaft 30 and the fly wheel 31 are provided with interengaging screw threads so that rotation of the fly wheel 31 also produces axial movement thereof with the result that at the end of one complete revolution of the fly wheel the pins 32 and 33 and the lugs 34 and 35 are located laterally of the members with which they are normally engageable. Due to this fact, there is no interference with additional rotation of the fly wheel.

It is of course understood that various modifications may be made in the device above described without in any way departing from the spirit of the invention as defined in the appended claims.

I claim:

1. Apparatus of the character described comprising web-feeding means, motor actuated driving means therefor, an oscillatable inertia member having resilient means tending to retain it in one position, electrically energized means for effecting rotation of said member away from said position, an operator controlled switch therefor, and switch means for the motor controlled by said inertia member and by said driving means.

2. Apparatus of the character described comprising web-feeding means, an oscillatable inertia member having resilient means tending to retain it in one position, electrically energized means for effecting rotation of said member away from said position, an operator controlled switch therefor, means including a motor for actuating said web-feeding means, and an energizing circuit for said motor controlled by said inertia member and by said actuating means.

3. Apparatus of the character described comprising web-feeding means, an oscillatable inertia member having resilient means tending to retain it in one position, electrical means for effecting rotation of said member away from said position, an energizing circuit for said means including an operator controlled switch and a self-closing switch momentarily opened by said inertia member near the end of its return stroke, a normally open motor circuit, means including a switch actuated by said inertia member at the end of its return stroke for closing said motor circuit, and means for opening said motor circuit after advancement of the web feeding means to a predetermined extent.

4. Apparatus of the character described comprising web-feeding means, an oscillatable inertia member having resilient means tending to retain it in one position, electrical means for effecting rotation of said member away from said position, an energizing circuit for said means including an operator-controlled switch and a self-closing switch momentarily opened by said inertia member near the end of its return stroke, a self-opening switch momentarily closed by said inertia member at the end of its return stroke, a relay having its coil in series with said switch, a motor energizing circuit including the armature and contact of said relay, a holding circuit for said relay including its armature and contact, and a self-closing switch in said holding circuit actuated to open position by said web feeding means after a predetermined extent of movement thereof.

5. A device of the character described comprising a web-feeding means, a member movable to and fro, connections between said means and said member for moving said means upon movement of said member in one direction, an electric motor for moving said member in one direction and a spring motor for moving it in the other direction, a circuit for said motor including a switch, impositive means for maintaining said switch either in closed or open position, electro-magnetic means for moving said switch from either of its positions to its other position, circuits for said electro-magnetic means controlled by said member at opposite ends of its stroke, a second switch in said motor circuit, operator controlled means for closing said switch, a holding circuit for said switch effective upon closing thereof, and means controlled by said member at one end of its stroke for opening said holding circuit.

6. A device of the character described comprising a web-feeding means, a member movable to and fro, connections between said means and said member for moving said means upon movement of said member in one direction, an electric motor for moving said member in one direction and a spring motor for moving it in the other direction, a circuit for said motor including a switch, impositive means for maintaining said switch either in closed or open position, electro-magnetic means for moving said switch from either of its positions to its other position, circuits for said electro-magnetic means controlled by said member at opposite ends of its stroke, a second switch in said motor circuit, operator-controlled means for closing said switch, a holding circuit for said switch effective upon closing thereof, means controlled by said member at one end of its stroke for opening said holding circuit, and means actuated by said member upon its approach to one end of its stroke to connect a resistance in said motor circuit.

7. A device of the character described comprising a conveyor, web-feeding means, a member movable to and fro, connections between said means and said member for moving said means upon movement of said member in one direction, means including an electric motor and a clutch for moving said member in one direction, and a spring motor for moving it in the other direction, a circuit for said motor including a switch, impositive means for maintaining said switch either in closed or open position, electro-magnetic means for moving said switch from either of its positions to its other position, circuits for said electro-magnetic means controlled by said member at opposite ends of its stroke, a second switch in said motor circuit, operator-controlled means for closing said switch, a holding circuit for said switch effective upon closing thereof, means controlled by said member at one end of its stroke for opening said holding circuit, electro-magnetic means in shunt to said motor for rendering said clutch operative upon energization of said motor and spring means tending to render said clutch inoperative.

8. A device of the character described comprising a conveyor, web-feeding means, a member movable to and fro, connections between said means and said member for moving said means upon movement of said member in one direction, means including an electric motor and a clutch for moving said member in one direction, and a spring motor for moving it in the other direction, a circuit for said motor including a switch, impositive means for maintaining said switch either in closed or open position, electro-magnetic means for moving said switch from either of its positions to its other position, circuits for said electro-magnetic means controlled by said member at opposite ends of its stroke, a second switch in said motor circuit, operator controlled means for closing said switch, a holding circuit for said switch effective upon closing thereof, means controlled by said member at one end of its stroke for opening said holding circuit, electro-magnetic means in shunt to said motor for rendering said clutch operative upon energization of said motor, spring means tending to render said clutch inoperative, and means actuated by said member upon its approach to one end of its stroke for connecting a resistance in said motor circuit.

9. A device of the character described comprising a web-feeding means, a member movable to and fro, connections between said means and said member for moving said means upon movement of said member in one direction, means including a motor and a self-disengaging clutch for moving said member in one direction, a spring motor for moving said member in the opposite direction, a motor switch, electro-magnetic means for moving said switch between closed and open position, an electro-magnet in shunt to said motor and effective upon energization of the motor to engage said clutch, energizing circuits for said electro-magnetic means including a self-opening switch closed by said member at one end of its stroke and a self-closing switch opened by said member at the other end of its stroke, a self-opening switch in said motor circuit, operator-controlled means for closing said second switch, a holding circuit for said second switch energized upon closure of said switch, and a self-closing switch in said holding circuit opened by said member at one end of its stroke.

10. A device of the character described comprising a rotatable member, a spring exerting force on said member tending to oppose movement thereof in one direction, a latch for preventing movement of said member in said direction, electro-magnetic means effective upon energization to render said latch inoperative, a second electro-magnetic means effective upon energization to apply an impulse to said member to rotate it in said one direction, means for simultaneously energizing both said electro-magnetic means, a first and a second stationary contact, a third contact arranged between said two stationary contacts and biased toward said first contact, and a projection on said rotatable member engageable with said third contact in the rest position of said member to maintain said third contact out of engagement with each of the other two contacts, said third contact being released for movement into engagement with said first contact upon one direction movement of said member from its rest position and being movable by said projection into engagement with said second contact upon opposite direction rotation of said member from it rest position.

11. A device of the character described comprising a rotatable member, a spring exerting force on said member tending to oppose movement thereof in one direction, a latch for preventing movement of said member in said direction, electro-magnetic means effective upon energization to render said latch inoperative, a second electro-magnetic means effective upon energization to apply an impulse to said member to rotate it in said one direction, a pair of parallel energizing circuits for said two electro-magnetic means having a common switch, a first and a second stationary contact, a third contact arranged between said two stationary contacts and biased toward said first contact, and a projection on said rotatable member engageable with said third contact in the rest position of said member to maintain said third contact out of engagement with each of the other two contacts, said third contact being released for movement into engagement with said first contact upon one direction movement of said member from its rest position and being movable by said projection into engagement with said second contact upon opposite direction rotation of said member from its rest position.

12. A device of the character described comprising a rotatable member, a spring exerting force on said member tending to oppose movement thereof in one direction, a latch for preventing movement of said member in said direction, electro-magnetic means effective upon energization to render said latch inoperative, a second electro-magnetic means effective upon energization to apply an impulse to said member to rotate it in said one direction, a pair of parallel energizing circuits for said two electro-magnetic means having a common switch, a normally closed switch in the circuit of said second electro-magnetic means, means for opening said last-named switch by said member on its return stroke, a first and a second stationary contact, a third contact arranged between said two stationary contacts and biased toward said first contact, and a projection on said rotatable member engageable with said third contact in the rest position of said member to maintain said third contact out of engagement with each of the other two contacts, said third contact being released for movement into engagement with said first contact upon one direction movement of said member from its rest position and being movable by said projection into engagement with said second contact upon opposite direction rotation of said member from its rest position.

13. A device of the character described comprising a web feeder, driving means for said feeder including a motor, an oscillatable inertia member having resilient means tending to retain it in one position, electrically operated means for effecting rotation of said member away from said position, an operator controlled switch for said electrically-operated means, and switch means for the motor controlled by said inertia member and said feeder.

14. A device of the character described comprising a web feeder, an oscillatable inertia member having resilient means tending to retain it in one position, electrically energized means for effecting rotation of said member away from said position, an operator controlled switch for said last-named means, means including a motor for actuating said feeder, and an energizing circuit for said motor controlled by said inertia member and said feeder actuating means.

15. A device of the character described comprising a rotatable web feeder, a member movable to and fro, connections between said member and said feeder for rotating said feeder upon movement of said member in one direction, an electrical motor for moving said member in one direction and a spring motor for moving it in the opposite direction, a circuit for said motor including a switch, electro-magnetic means for effecting actuation of said switch between two different positions, circuits for said electro-magnetic means controlled by said member at opposite ends of its stroke, a second switch in said motor circuit, operator-controlled means for actuating said switch, an operating circuit for said switch effective upon closing thereof, and means controlled by said member at one end of its stroke for opening said holding circuit.

16. A device of the character described comprising a rotatable web feeder, a member movable to and fro, connections between said member and said feeder for rotating said feeder upon movement of said member in one direction, an electrical motor for moving said member in one direction and a spring motor for moving it in the opposite direction, a circuit for said motor including a switch, electro-magnetic means for effecting actuation of said switch between two different positions, circuits for said electro-magnetic means controlled by said member at opposite ends of its stroke, a second switch in said motor circuit, operator-controlled means for actuating said switch, an operating circuit for said switch effective upon closing thereof, means controlled by said member at one end of its stroke for opening said holding circuit.

17. A device of the character described comprising a roller, two or more sprockets, a ratchet connection between said roller and one sprocket, a chain trained around said sprockets, a motor, means interconnecting said motor and another sprocket, a spring tending to oppose movement of said chain in one direction, a first and a second lug carried by said chain, a self-opening pair of contacts held closed by said first lug in one position of the chain, a self-closing pair of contacts adapted to be opened by said second lug in a second position of the chain, a solenoid in series with each pair of contacts, a common armature for said solenoids, and a motor controlling switch actuated by said armature.

18. A device of the character described comprising a roller, two or more sprockets, a ratchet connection between said roller and one sprocket, a chain trained around said sprockets, a motor, means interconnecting said motor and another sprocket, a spring tending to oppose movement of said chain in one direction, a first and a second lug carried by said chain, a self-opening pair of contacts held closed by said first lug in one position of the chain, a self-closing pair of contacts adapted to be opened by said second lug in a second position of the chain, a solenoid in series with each pair of contacts, a first and a second motor controlling switch connected in series, a common armature for said solenoids adapted to actuate said first switch, and operator-controlled means for actuating said second switch.

19. In the combination of claim 17, clutch means interconnecting said motor and third sprocket, a solenoid for actuating said clutch means connected in series with said motor controlling switch.

20. In the combination of claim 18, clutch means interconnecting said third sprocket and motor, and a solenoid for actuating said clutch means connected in series with said first motor controlling switch.

21. A device of the character described comprising a rotatable member, resilient means exerting force on said member tending to oppose rotation thereof in one direction, a latch for preventing rotation of said member in said direction, electrically energized means for rendering said latch inoperative, a second electrically energized means effective to rotate said member in said one direction, means for simultaneously energizing said two last-named means, a first and a second stationary contact, a third contact arranged between said two stationary contacts and biased toward said first contact, and a projection on said rotatable member engageable with said third contact in the rest position of said member to maintain said third contact out of engagement with each of the other two contacts, said third contact being released for movement into engagement with said first contact upon one direction movement of said member from its rest position and being movable by said projection into engagement with said second contact upon opposite direction rotation of said member from its rest position.

22. A device of the character described comprising a rotatable member, resilient means exerting force on said member tending to oppose rotation thereof in one direction, a latch for preventing rotation of said member in said direction, electrically energized means for rendering said latch inoperative, a second electrically energized means effective to rotate said member in said one direction, a pair of parallel energizing circuits for said last two means having a common switch, a first and a second stationary contact a third contact arranged between said two stationary contacts and biased toward said first contact, and a projection on said rotatable member engageable with said third contact in the rest position of said member to maintain said third contact out of engagement with each of the other two contacts, said third contact being released for movement into engagement with said first contact upon one direction movement of said member from its rest position and being movable by said projection into engagement with said second contact upon opposite direction rotation of said member from its rest position.

23. A device of the character described comprising a rotatable member, resilient means exerting force on said member tending to oppose rotation thereof in one direction, a latch for preventing rotation of said member in said direction, electrically energized means for rendering said latch inoperative, a second electrically energized means effective to rotate said member in said one direction, a pair of parallel energizing circuits for said last two means having a common switch, a normally closed switch in the circuit of said second electrically energized means, means for opening said last-named switch by said member on its return stroke, a first and a second stationary contact, a third contact arranged between said two stationary contacts and biased toward said first contact, and a projection on said rotatable member engageable with said third contact in the rest position of said member to maintain said third contact out of engagement with each of the other two contacts, said third contact being released for movement into engagement with said first contact upon one direction movement of said member from its rest position and being movable by said projection into engagement with said second contact upon opposite direction rotation of said member from its rest position.

24. Apparatus of the character described comprising web feeding means, motor-actuated driving means therefor, a normally open motor circuit, a second circuit, an operator-controlled switch for said second circuit, and means energized by said second circuit and including an inertia member for closing the motor circuit a predetermined period of time after operation of said switch.

JOHN E. BURBANK.